(12) United States Patent
Sakamoto

(10) Patent No.: US 6,829,114 B2
(45) Date of Patent: Dec. 7, 2004

(54) METHOD OF PRODUCING MEMBER WITH PERIODICAL STRUCTURE FINER THAN WAVELENGTH AND OPTICAL ELEMENT FORMED OF THE MEMBER

(75) Inventor: Junichi Sakamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/369,531

(22) Filed: Feb. 21, 2003

(65) Prior Publication Data

US 2003/0159771 A1 Aug. 28, 2003

(30) Foreign Application Priority Data

Feb. 25, 2002 (JP) .......................... 2002-048036

(51) Int. Cl.$^7$ ................................................ G02B 1/10
(52) U.S. Cl. ................ 359/900; 359/580; 359/586; 359/587; 428/426; 427/165
(58) Field of Search ................ 359/580, 582, 359/586, 587, 900; 428/426, 427, 428; 65/102; 427/164, 165

(56) References Cited

U.S. PATENT DOCUMENTS 5,885,315 A * 3/1999 Fredholm et al. ............. 65/102

2002/0119246 A1 8/2002 Sakamoto et al.

FOREIGN PATENT DOCUMENTS

JP 07-191209 7/1995

* cited by examiner

Primary Examiner—Fayez Assaf
(74) Attorney, Agent, or Firm—Fitzpatrick, Cella, Harper & Scinto

(57) ABSTRACT

Method of producing a member of a periodic structure having, alternately stacked, a plurality of high refractive index layers and a plurality of low refractive index layers. The method includes alternately superimposing on each other a plurality of first sheet glasses having a high refractive index and a plurality of second sheet glasses having a low refractive index, and heating the stacked member to at least a glass transition temperature. In addition, the method includes applying a pressure to the heated stacked member perpendicularly to a principal surface of the sheet glasses or extending the heated stacked member parallel to the principal surface of the sheet glasses, thereby integrating the stacked member while reducing the thickness of each of the sheet glasses.

3 Claims, 3 Drawing Sheets

METHOD OF PRODUCING MEMBER WITH PERIODICAL STRUCTURE FINER THAN WAVELENGTH AND OPTICAL ELEMENT FORMED OF THE MEMBER

BACKGROUND OF THE INVENTION

1. Field of the Invention

The present invention relates to a method of producing a member having a periodic structure finer than a wavelength and an optical element formed of the member. According to the present invention, by forming an artificially controlled fine structure, a base bulk material for forming an optical element having an optional (or desired) refractive index distribution or optical anisotropy can be produced.

2. Related Background Art

Hitherto, an optical crystal or an organic film has been used as means for obtaining an optional refractive index distribution or optical anisotropy. For example, a low-pass filter having a plurality of quartz crystal plates or $LiNbO_3$ thin plates adhered to each other, a wavelength plate or a deflecting plate having an optically anisotropic film sandwiched by optical glass sheets, and the like have been put to practical use. These are bulk materials and are therefore suitable for various kinds of processing and can be handled relatively easily.

However, in the conventional low-pass filter using a crystal, in the case where quartz crystal is used, the difference between refractive indexes of an ordinary ray and an extraordinary ray is small, so that it is necessary to increase the thickness of the crystal in order to obtain a sufficient performance as an optical element. It is, therefore, difficult to reduce the size of the low-pass filter. On the other hand, $LiNbO_3$ has a large difference between refractive indexes of an ordinary ray and an extraordinary ray, so that the thickness thereof has to be reduced more than necessary, which makes its processing difficult and requires particular attention in the handling thereof.

Further, because the conventional film-type phase plate or wavelength plate is made of an organic material, there has been a problem that the high-temperature resistance is poor. Therefore, for example, when used as a component in a projector such as a liquid crystal projector, it is unsuitable for use as an optical component provided in the vicinity of an optical source the temperature of which becomes high.

On the other hand, in recent years, in accordance with development of a fine processing technique, it has become possible to produce a fine structure of a submicron order. At present, the methods of producing an element of a fine structure can be classified into the following three types.

A first-type method is a method of stacking thin layers with different refractive indexes using a film formation technique such as vapor deposition or sputtering. According to this method, there is a possibility that a bulk material may be made by stacking an extremely large number of layers.

A second-type method is a method of using exposure, development and etching as is the case with the method of producing a diffraction grating or the like, which is the so-called photolithography. By this method, it has recently become possible to produce a structure finer than a wavelength as the techniques of exposure and etching have advanced. In addition, with the photolithography, since it is possible to distribute and form desired patterns having different shapes on a plane, an artificial refractive index distribution can be formed two-dimensionally. On the other hand, since there is a limitation in the thickness, it is difficult to make a bulk material.

A third-type method is a method of producing a fine structure having a directionality by oblique vapor deposition technique. With this method, a thin film having structural birefringence can be made without using an advanced fine processing technique.

Those elements with fine structures that are produced by the above-described methods are constituted of a metal or a dielectric material and have a high-temperature resistance. In addition, concerning the optical function, since they are designed independently, even when it is difficult to handle an obtained element, it is possible to determine specifications freely by design change or the like. For example, a member with a fine structure produced by the first-type method can be applied to an interference film which is used so as to make a light incident perpendicularly on its film surface and have hitherto been applied to various fields. In the case where the member is used as such an interference film, it is sufficient that a maximum number of layers to be stacked is approximately one hundred, although depending upon the desired optical characteristic.

However, in order to develop refractive index anisotropy in a member having such a fine structure, it is necessary to use the member with a light being made incident on a film horizontally. Thus, for example, in the case where the member is used as a CCD optical component of approximately 1/3 inch, a size of approximately 6 mm square is required. When such a member is to be produced by the first-type method, because the formed thin film structure has a thickness of one layer of approximately 100 nm at the most, the process results in a multilayer structure having as many as 60,000 layers. In this case, even if one layer can be formed in ten seconds, it takes about one week to produce the member. In addition, in case of a thin film, an internal stress tends to be generated when formed. Due to this internal stress, it is difficult to produce a thin film structure with a thickness of several mm.

On the other hand, the second-type method is for obtaining an optional pattern on a substrate through steps of film formation, resist application, exposure, development, etching, and peeling off (see, for example, Japanese Patent Application Laid-Open No. 7-191209). With this method, although the structure of a film material can be processed optionally by etching, the etching has a limitation in a depth. In particular, in the case where it is desired to obtain a line/space finer than a wavelength, a complete rectangular structure cannot be obtained due to an influence of side etching, edge deposition, or the like. In addition, even if the complete rectangular structure is obtained, it has a depth in the order of several $\mu$m at the most and cannot be a bulk material.

Further, concerning a production apparatus to be used in the second-type method, an expensive stepper is required for performing exposure of a fine structure. Further, since an expensive apparatus such as an RIE or an ICPE is required for etching as well, the production cost will increase.

On the other hand, with the third-type method, since relatively inexpensive vapor deposition process is used, and since structural birefringence can be obtained simply by carrying out film formation obliquely, it can be said that this method is very effective. In this method, a high refractive index material is a vapor deposition material and a low refractive index material is the air as voids.

However, in the third-type method, although the size of the voids is controlled by controlling the incident angle of vapor deposition particles on a substrate and vapor deposition conditions, the size can only be increased by approximately 30% at the maximum. In addition, since the variation of size is also large, the effect of structural birefringence decreases and, at the same time, lowering in the transmission efficiency due to light scattering also occurs. Further, it is difficult to make a film thick as in the first-type method.

SUMMARY OF THE INVENTION

It is, therefore, an object of the present invention to solve the above-described prior art problems and provide a method of producing a member which has a periodic structure finer than a wavelength, inexpensively and easily.

Further, it is another object of the present invention to provide an optical element such as a phase plate or a low-pass filter which can be produced inexpensively and easily by processing the member produced by the above-described method.

According to the present invention, there is provided a method of producing a member of a periodic structure having a plurality of high refractive index layers and a plurality of low refractive index layers having a refractive index lower than a refractive index of the high refractive index layers, alternately stacked. Each of the high refractive index layers and low refractive index layers has a thickness finer than a wavelength. The method comprising the steps of:

alternately superimposing a plurality of first sheet glasses having a high refractive index and a plurality of second sheet glasses having a refractive index lower than a refractive index of the first sheet glasses on each other to form a stacked member;

heating the stacked member to a temperature of not less than a glass transition temperature; and applying a pressure to the heated stacked member perpendicularly to a principal surface of the sheet glasses or extending the heated stacked member parallel to the principal surface of the sheet glasses, thereby integrating the stacked member while reducing the thickness of each of the sheet glasses.

DESCRIPTION OF THE PREFERRED EMBODIMENTS

Figure 1:
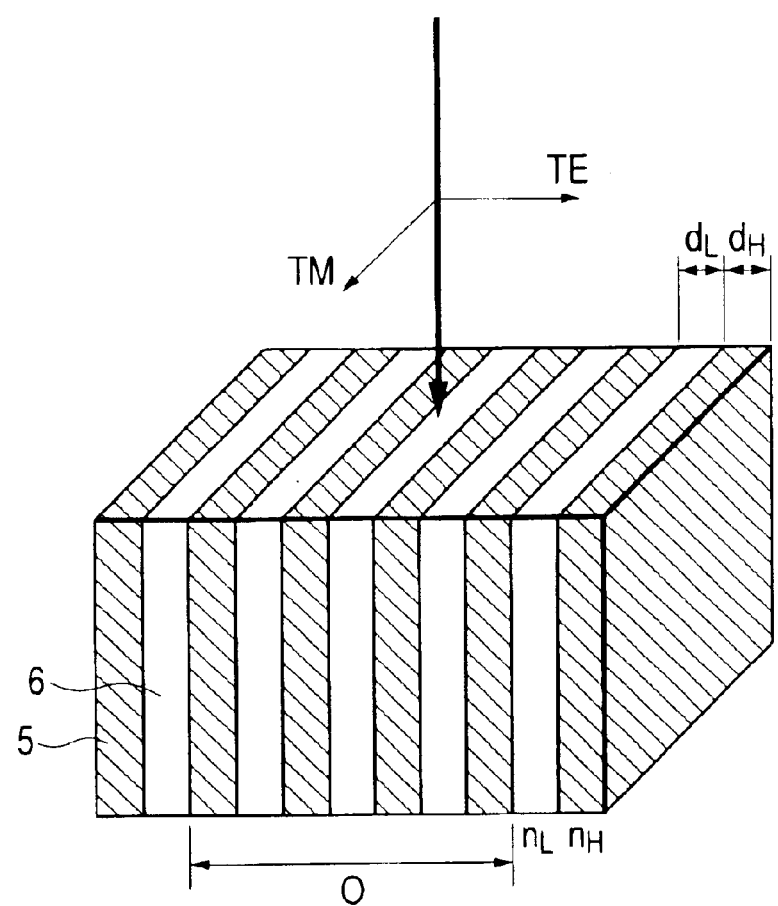
FIG. 1 is a schematic view of a periodic structure finer than a wavelength.

Preferred embodiments of the present invention will be hereinafter described in detail.

The member produced by the method of the present invention is a member of a periodic structure having a plurality of high refractive index layers and a plurality of low refractive index layers having a refractive index lower than a refractive index of the high refractive index layers alternately stacked, each of the high refractive index layers and low refractive index layers having a thickness finer than a wavelength. In the present invention, a plurality of first sheet glasses having a high refractive index and a plurality of second sheet glasses having a refractive index lower than a refractive index of the first sheet glasses are alternately superimposed on each other to form a stacked member; the stacked member is then heated to a temperature of not less than a glass transition temperature; and a pressure is applied to the heated stacked member perpendicularly to a principal surface of the sheet glasses or the heated stacked member is extended parallel to the principal surface of the sheet glasses, thereby integrating the stacked member while reducing the thickness of each of the sheet glasses. Here, it is desirable that the first sheet glass and the second sheet glass each have a thickness of several tens $\mu$m. In the above-described formation process, after the stacked glass material is heated to a temperature not less than the glass transition temperature, the stacked glass material is formed in a manner in which it is compressed or extended such that a film thickness of each layer is reduced to a design value. In this case, for ease of the formation, for example, it is also possible to, after processing stacked layer structures each of 1,000 layers, superimpose several of these processed members and, after heating this stacked glass material to a temperature not less than the glass transition temperature, finally finish the stacked glass material to a necessary thickness.

The method of heating the stacked glass material is not specifically limited as long as glass blanks can be heated uniformly and includes an atmospheric furnace, a belt furnace, and the like.

Moreover, it is also possible to, after stacking sheet glasses of about 1 mm in thickness having a high refractive index, and sheet glasses of about 1 mm in thickness having a low refractive index in a total of approximately 100 layers and heating this stacked glass material to a temperature not less than the glass transition temperature, process the stacked glass material in a manner in which it is compressed or extended such that the area of an upper surface thereof is increased by four times. Then this member is cut so as to divide it into four in a direction perpendicular to the layers. The divided members maybe repeatedly subjected to stacking, compression or extension, and cutting several times, thereby finishing the stacked glass material such that the film thickness of each layer becomes a design value.

As the method of thinning the stacked glass material, there may be mentioned a method of extending it by applying a pressure by a heat roller, a heat press, or the like, a method of extending it by holding both ends of it in an atmospheric furnace to obtain thin layers, a method of using both of these methods, and the like. However, the present invention is not limited to these methods.

In addition, here, the physical property values of the sheet glasses having a high refractive index and the sheet glasses having a low refractive index are not particularly limited as long as the sheet glasses have such a structure that withstands process conditions including subsequent production processes and desired optical characteristic can be obtained.

Moreover, according to the production method of the present invention, in the case where rapid cooling or rapid heating is performed in the production process, the characteristics of the glass transition temperatures and the coefficients of linear thermal expansion become important. In the case where the stacked glass material is produced from materials having significantly different glass transition temperatures, a material having a low transition temperature crushes due to the weight of the stacked structure, while a material having a high transition temperature is not deformed at all. As a result, in the case where the material having a high glass transition temperature is formed in a film thickness according to a design value, the thickness of a layer having a low glass transition temperature is reduced by an amount corresponding to the crush due to its own weight. Therefore, in order to soften the first sheet glass having a high refractive index and the second sheet glass having a low refractive index substantially simultaneously, the condition of $\Delta Tg \leq 30$ (° C.) is required. Here, $\Delta Tg$ represents a difference between the glass transition temperatures of the first sheet glass and the second sheet glass.

In addition, in a cooling step, in the case where materials having significantly different coefficients of linear thermal expansion are stacked, a large thermal stress will be generated in the materials. In the case where such materials are cut or polished in a subsequent step, it is likely that stress rupture may be caused. Therefore, in order to reduce the remaining thermal stress as much as possible, the condition of $\Delta \alpha \; 30 \times 10^{-7}$ (1/° C.) is required. Here, $\Delta \alpha$ represents a difference between coefficients of linear thermal expansion of the first sheet glass and the second sheet glass.

In addition, in a cooling step, in the case where materials having significantly different coefficients of linear thermal expansion are stacked, a large thermal stress will be generated in the materials. In the case where such materials are cut or polished in a subsequent step, it is likely that stress rupture may be caused. Therefore, in order to make the remaining thermal stress as least as possible, the condition of $\Delta \alpha \leq 30 \times 10^{-7}$ (1/° C.) is required. Here, $\Delta \alpha$ represents a difference between coefficients of linear thermal expansion of the first sheet glass and the second sheet glass.

In addition, in the case where it is desired to obtain sufficient optical characteristics, it is preferable to make a difference between the refractive indices of the high refractive index layer and the low refractive index layer as large as possible. Here, FIG. 1 shows a schematic view of a periodic structure finer than a wavelength. In FIG. 1, reference numeral 5 denotes a high refractive index layer and 6 denotes a low refractive index layer. Further, reference symbol O denotes an optical axis. When it is defined that the refractive index of the high refractive index layer is $n_H$, the thickness of the high refractive index layer is $d_H$, the refractive index of the low refractive index layer is $n_L$, and the thickness of the low refractive index layer is $d_L$, in the case where a pitch $(d_H+d_L)$ is sufficiently smaller than a wavelength of light, the effective refractive index of a light wave traveling parallel to the layers is given by the following equations (1) and (2):

$$n_{TE}=((n_H^2 \cdot d_H + n_L^2 \cdot d_L)/(d_H+d_L)) \; (1/2) \quad (1)$$

$$n_{TM}=((d_H+d_L)/(d_H/n_H^2+d_L/n_L^2)) \; (1/2) \quad (2)$$

Here, TE denotes a wave of an electric field vibrating parallel to the layers and TM denotes a wave of an electric field vibrating perpendicularly to the layers. Further, $n_{TE}$ represents a refractive index of the fine periodic structure with respect to the TE wave and $n_{TM}$ represents a refractive index of the fine periodic structure with respect to the TM wave. A stacked glass material having a difference in the values of $n_{TE}$ and $n_{TM}$ is called a structural birefringent or form anisotropic material, which acts as an optical anisotropic material.

The value of $|n_{TE}-n_{TM}|$ of an artificial quartz crystal which is generally used widely is 0.009. In the case where it is desired to obtain an effect larger than that, the condition of $\Delta n \geq 0.2$ is required. Here, $\Delta n$ represents a difference between the refractive indices of the high refractive index layer and the low refractive index layer. Here, when processability, material stability, material costs, and the like are taken into account, a stacked glass material with $\Delta n \geq 0.15$ can practically be used. However, in the case where the refractive index difference is less than 0.15, the stacked glass material is not suited for practical use because the effect of structural birefringence remarkably lowers.

Further, the optical element of the present invention which is formed of the member produced as described above includes, for example, an element which is obtained by cutting a bulk stacked structure member at an angle of 45° with respect to the layer direction and effecting polishing to a thickness of several tens $\mu$m. The element obtained in this way functions as a Savart plate.

In addition to the above, as the optical element of the present invention, there is an element obtained by cutting a bulk stacked structure member produced by the above-described method at an angle of 90° with respect to the layer direction and effecting polishing to a thickness of several $\mu$m. The element obtained in this way functions as a wavelength plate.

In addition, other than the optical elements described above, all those elements which can exhibit a function with respect to light resulting from the structural birefringence can be formed from the member produced by the method of the present invention, and the optical element of the present invention is not limited to a Savart plate or wavelength plate.

A method of producing a member having a fine periodic structure of the present invention will be described with reference to FIGS. 2A to 2D.

Figure 2A:
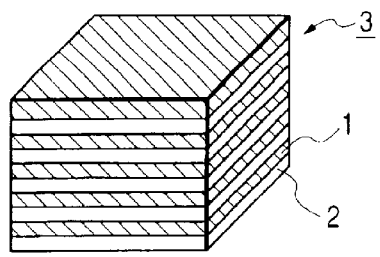
FIGS. 2A, 2B, 2C and 2D are schematic views for explaining a method of producing a member having a fine periodic structure of the present invention.

First, as shown in FIG. 2A, a plurality of first sheet glasses 1 with a high refractive index and a plurality of second sheet glasses 2 with a refractive index lower than that of the first sheet glasses 1 are alternately superimposed on each other to form a stacked member 3.

Figure 2B:
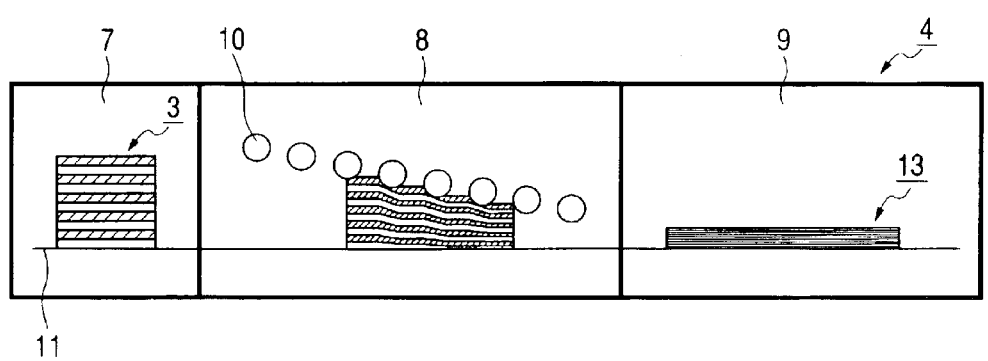

Next, as shown in FIG. 2B, the stacked member 3 is set in a belt furnace 4. The belt furnace 4 is partitioned into a first chamber 7, a second chamber 8, and a third chamber 9, and the stacked member 3 is transported between the chambers with a belt conveyer 11. In the second chamber 8 are provided compression rollers 10 in multiple stages.

The first chamber 7 is a heating chamber. First, the stacked member 3 is carried into the first chamber 7 and heated to a temperature not less than the glass transition temperature. Next, the stacked member 3 is transported to the second chamber 8 by the belt conveyer 11, and the thickness of the stacked member 3 is gradually reduced by applying a pressure perpendicularly to the principal surface of the sheet glasses with the multi-stage rollers 10. Then, the stacked member 13 with the reduced thickness is transported to the third chamber 9 by the belt conveyer 11 and cooled slowly to room temperature.

Figure 2C:
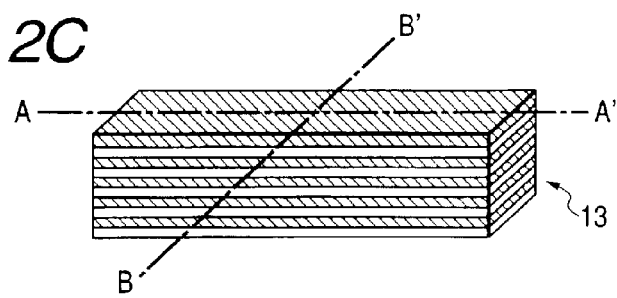
Figure 2D:
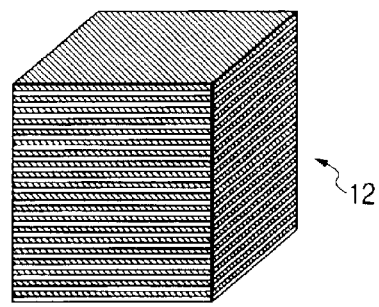

Next, the stacked member 13 is taken out from the third chamber 9 and divided into four along line segments A–A' and B–B' as shown in FIG. 2C. Then, the divided stacked members are superimposed on each other fourfold, and the superimposed stacked members are carried into the belt furnace 9 shown in FIG. 2B again and subjected to temperature rise, compression formation, and cooling. Such processes including those shown in FIGS. 2B and 2C are repeated a given number of times, whereby a member 12 as shown in FIG. 2D is produced which has a plurality of high refractive index layers and a plurality of low refractive index layers with a refractive index lower than that of the high refractive index layers 1 alternately stacked. Also, member 12 has a periodic structure in which the thickness of each of the respective high refractive index layers and low refractive index layers is finer than a wavelength.

Examples of a method of producing a member having a fine periodic structure using the method as described above will be hereinafter described in detail.

EXAMPLE 1

A member having a fine periodic structure was produced using the processes as described in FIGS. 2A to 2D.

First, 50 sheets each of S-BSL7 (optical glass produced by OHARA CORPORATION: n=1.516) having a size of 100 mm×100 mm and a thickness of 1 mm and S-LAH55 (optical glass produced by OHARA CORPORATION: n=1.835) having a size of 100 mm×100 mm and a thickness of 1 mm were subjected to brush cleaning using a surfactant. Thereafter, the optical sheet glasses were subjected to pure water brush cleaning and pure water rinsing, left in an atmospheric furnace of 110° C. for 10 minutes to be dried. Here, S-LAH55 corresponds to the first sheet glass 1 and S-BSL7 corresponds to the second sheet glass 2.

Next, the second sheet glasses (S-BSL7) 2 and the first sheet glasses (S-LAH55) 1 were alternately superimposed on each other to produce a glass block (stacked member 3) with 100 layers having a size of 100 mm×100 mm×100 mm as shown in FIG. 2A (in FIG. 2A, the glass block is schematically shown as a ten layer structure).

Next, as shown in FIG. 2B, the glass block (stacked member 3) was set in the belt furnace 4 in which the compression rollers 10 were provided in multiple stages. Firstly, the first chamber 7 was used as a heating area. Here, the temperature of the glass block was raised to a temperature higher by 5° C. than the glass transition temperature. The glass transition temperatures of the second sheet glass (S-BSL7) 2 and the first sheet glass (S-LAH55) 1 were 576° C. and 700° C., respectively. Therefore, the temperature of the glass block was raised to 705° C. At this time, a guide with a width of 100 mm made of a copper plate coated with platinum on the surface thereof was provided to reduce influence of deformation so as to prevent deformation of the second sheet glasses (S-BSL7) 2 having the low glass transition temperature due to its own weight. The temperature raising rate was 5° C./min.

Next, the glass block (stacked member 3) was transferred to the second chamber 8, and its total thickness was gradually reduced by the multi-stage type heat rollers (multi-stage rollers) 10. The moving speed of the glass block (stacked member 3) was set to 30 mm/min. In this case, the thickness of the glass block sent out from a last roller was 25 mm. Then, the glass block (stacked member 13) was moved to the third chamber 9 and cooled slowly. The cooling rate was set to 3° C./min. In this way, the glass block (stacked member 13) was cooled to room temperature.

Next, as shown in FIG. 2C, the glass block (stacked member 13) was cut along line segments A–A' and B–B' to be divided into four by use of a dicer in a direction perpendicular to the layers. Then, after cleaning each of the cut blocks, the blocks were superimposed fourfold such that a layer formed of the second sheet glass (S-BSL7) and a layer formed of the first sheet glass (S-LAH55) were brought into contact with each other. If this superimposition is performed such that two cut blocks are flush with each other at two cut sides thereof, an effective area which can be secured finally is large. The blocks superimposed in this way were subjected to thermal forming in the belt furnace shown in FIG. 2B again such that the final thickness became 25 mm.

When these processes were repeated five times, a glass block of a 102,400 layer structure with a thickness of 25 mm was obtained. At this time, the thickness of one layer was about 244 nm. Moreover, this glass block was subjected to temperature rise, compression forming, and cooling in the same manner as described above in the belt furnace having compression rollers provided therein in multiple stages so as to reduce the thickness of the glass block to 10.24 mm, so that a glass blank having a size of 300 mm×300 mm and a thickness of 10.24 mm was obtained. Here, a frame-like area of a width of about 25 mm at the periphery of the glass blank had poor uniformity of layers affected by involution of the compression rollers and deformation due to its own weight and was therefore cut off by a dicer.

In this way, a glass blank (member 12 having a fine periodic structure) of a 102,400 layer structure consisting of alternating layers of high refractive index glasses and low refractive index glasses and having a film thickness of each layer of 100 nm as shown in FIG. 2D was obtained. This glass blank had a size of 250 mm square and a thickness of 10.24 mm.

EXAMPLE 2

The glass blank produced in Example 1 was processed to form a Savart plate.

Figure 3A:
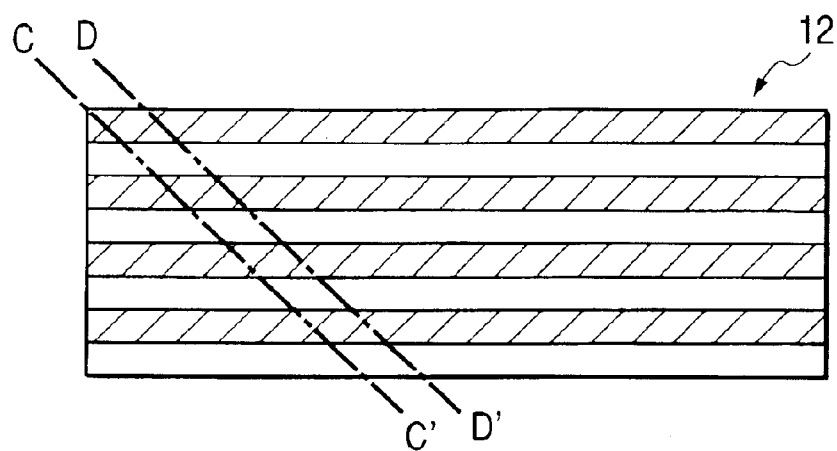
FIGS. 3A and 3B are schematic views for explaining a method of forming a Savart plate from a member produced by the method of the present invention.
Figure 3B:

First, as shown in FIG. 3A, the member 12 produced in Example 1 was cut along line segments C–C' and D–D' at an angle of 45° C. with respect to the layer direction such that the thickness of a cut member became 1.2 mm. Next, the peripheral part of the member was cut off such that each corner had a right angle and the cut member had a size of 14 mm×14 mm, whereby a thin plate with a size of 14 mm×14 mm and a thickness of 1.2 mm was obtained. Glass polishing was applied to this thin plate to obtain a Savart plate with a size of 14 mm×14 mm and a thickness of 1 mm.

When a separation width of an ordinary ray and an extraordinary ray of the obtained Savart plate was measured, it was about 15 $\mu$m. It was found that this value was sufficiently large as compared with 5.88 $\mu$m of an artificial quartz crystal of a thickness of 1 mm. In addition, in the case where a low pass filter was produced using the Savart plate of this example, an equivalent effect was attained with a thickness of approximately ½.55 of the thickness of the artificial quartz crystal.

EXAMPLE 3

A glass blank was produced in the same manner as in Example 1 with the exception that PBH71 (optical glass produced by OHARA CORPORATION: n=1.923) was used as a high refractive index glass material (first sheet glass), FSL3 (optical glass produced by OHARA COROPORATION: n=1.4645) was used as a low refractive index glass material (second sheet glass), and the glass heating (or holding) temperature was set to 394° C.

Since the combination of these two kinds of glasses had a particularly great difference in refractive index, and since the glass transition temperature was as low as 389° C., the period of time required for the temperature rise and cooling was short and the birefringence was particularly high.

EXAMPLE 4

The glass blank obtained in Example 3 was processed in the same manner as Example 2 to produce a Savart plate. When a separation width of an ordinary ray and an extraordinary ray of this Savart plate was measured, it was approximately 36 $\mu$m.

EXAMPLE 5

A glass blank was produced in the same manner as in Example 1 with the exception that LAH78 (optical glass produced by OHARA CORPORATION: n=1.901) was used as a high refractive index glass material (first sheet glass), BSM14 (optical glass produced by OHARA COROPORATION: n=1.603) was used as a low refractive index glass material (second sheet glass), the glass heating (or holding) temperature was set to 664° C., and the guide plate coated with platinum was removed.

Since the combination of these two kinds of glasses had a relatively small refractive index difference but had a small difference in glass transition temperature of 1° C. and the difference in coefficient of linear thermal expansion was as small as $2 \times 10^{-7}/°$ C., the glass blank could be produced without the use of the guide made of platinum-coated copper plate.

REFERENCE EXAMPLE 1

A member (glass blank) having a fine periodic structure was produced in the same manner as Example 1 with the exception that the copper plate coated with platinum on its surface was removed. In this reference example, the second sheet glass (S-BSL) was deformed due to its own weight in the first chamber as the heating area.

A Savart plate was formed of this glass blank in the same manner as Example 2 and a separation width of an ordinary ray and an extraordinary ray was measure, with the result that it was approximately 3 $\mu$m. It was found that this value was substantially equal to the value of the artificial quartz crystal and the effect of refractive index anisotropy was small. In addition, when the thickness of each layer was evaluated with a transmission microscope, the layer formed of the second sheet glass (S-BSL) had a thickness of approximately 10 nm and the layer formed of the first sheet glass (S-LAH55) was approximately 190 nm.

REFERENCE EXAMPLE 2

A glass blank was produced in the same manner as in Example 1 with the exception that PBH6W (optical glass produced by OHARA CORPORATION: n=1.805) was used as a high refractive index glass material (first sheet glass), S-FPL51 (optical glass produced by OHARA COROPORATION: n=1.497) was used as a low refractive index glass material (second sheet glass), and the glass heating (or holding) temperature was set to 465° C.

Since these glass materials had coefficients of linear thermal expansion of $90 \times 10^{-7}$ (1/° C.) and $156 \times 10^{-7}$ (1/° C.), respectively, and cracks occurred in the glass at the time of cooling due to a too large thermal stress and the glass was clouded in white color.

REFERENCE EXAMPLE 3

A glass blank was produced in the same manner as in Example 1 with the exception that S-LAM54 (optical glass produced by OHARA CORPORATION: n=1.757) was used as a high refractive index glass material (first sheet glass), BSM7 (optical glass produced by OHARA COROPORATION: n=1.607) was used as a low refractive index glass material (second sheet glass), and the glass heating (or holding) temperature was set to 672° C.

The glass obtained here was processed in the same manner as Example 2 to produce a Savart plate. When a separation width of an ordinary ray and an extraordinary ray of this Savart plate was measured, it was approximately 4 $\mu$m.

EXAMPLE 6

A $\lambda/4$ plate was produced using each of the glass blanks produced in Examples 1, 3 and 5. The $\lambda/4$ plate was formed by cutting the glass blank at an angle of 90° with respect to the layer direction and effecting polishing. The design wavelength $\lambda$ was 632.8 nm. The thicknesses and the measured values of phase differences measured with an ellipsometer of the $\lambda/4$ plates made from the glass blanks having the above-described glass combinations are shown in Table 1.

TABLE 1

| Glass Material (L/H) | n (TE) | n (TM) | Thickness of $\lambda/4$ Plate ($\mu$m) | Phase Difference (degree) |
|---|---|---|---|---|
| S-BSL 7/ S-LAH55 | 1.6713 | 1.6461 | 6.3 | 46.0 |
| PBH71/FSL3 | 1.7091 | 1.6477 | 2.6 | 45.2 |
| LAH78/BSM14 | 1.7586 | 1.7333 | 6.3 | 45.5 |

In Table 1, n(TE) represents a refractive index with respect to a wave (TE wave) of an electric field vibrating parallel to the layer and n(TM) represents a refractive index with respect to a wave (TM wave) of an electric field vibrating perpendicularly to the layer.

Various modifications are possible for the present invention other than the examples described above. For example, although the thickness of each sheet glass was reduced by applying a pressure to a heated stacked member perpendicularly to the principal surface of the sheet glass in the examples, instead of this, a method of extending the stacked member parallel to the principal surface of the sheet glass may be used. The present invention includes all of such modifications as long as the modifications do not depart from the scope of claims.

What is claimed is:

1. A method of producing a member of a periodic structure having a plurality of high refractive index layers and a plurality of low refractive index layers having a refractive index lower than a refractive index of the high refractive index layers alternately stacked, each high refractive index layer and low refractive index layer having a thickness finer than a wavelength, said method comprising the steps of:

alternately superimposing a plurality of first sheet glasses having a high refractive index and a plurality of second sheet glasses having a refractive index lower than a refractive index of the first sheet glasses on each other to form a stacked member;

heating the stacked member to a temperature of not less than a glass transition temperature of the first and second sheets; and applying a pressure to the heated stacked member perpendicularly to a principal surface of the sheet glasses or extending the heated stacked member parallel to the principal surface of the sheet glasses, thereby integrating the stacked member while reducing the thickness of each sheet glass, wherein a difference between a glass transition temperature of the first sheet glasses and a glass transition temperature of the second sheet glasses $\leq 30°$ C. and a difference between a coefficient of linear thermal expansion of the first sheet glasses and a coefficient of linear thermal expansion of the second sheet glasses is $\leq 30 \times 10^{-7}/°$ C.

2. The method according to claim 1, wherein a difference between the refractive index of the high refractive index layers and the refractive index of the low refractive index layers is 0.15.

3. An optical element formed by processing the member produced by the method as set forth in claim 1.

* * * * *

UNITED STATES PATENT AND TRADEMARK OFFICE
CERTIFICATE OF CORRECTION

PATENT NO. : 6,829,114 B2
DATED : December 7, 2004
INVENTOR(S) : Junichi Sakamoto It is certified that error appears in the above-identified patent and that said Letters Patent is hereby corrected as shown below:

Column 4,
Line 39, "maybe" should read -- may be --.

Column 5,
Line 18, "$\Delta\alpha\ 30 \times 10^{-7}$" should read -- $\Delta\alpha \leq 30 \times 10^{-7}$ --; and
Lines 21-30, should be deleted.

Column 6,
Line 64, "layers 1" should read -- layers, --.

Column 8,
Line 45, "COROPORA-" should read -- CORPORA- --.

Column 9,
Lines 1, 38 and 53, "COROPORA-" should read -- CORPORA- --.

Signed and Sealed this

Twenty-second Day of November, 2005

JON W. DUDAS
*Director of the United States Patent and Trademark Office*